United States Patent
Saiz

(10) Patent No.: US 9,702,254 B2
(45) Date of Patent: Jul. 11, 2017

(54) LIFT PROPULSION AND STABILIZING SYSTEM AND PROCEDURE FOR VERTICAL TAKE-OFF AND LANDING AIRCRAFT

(76) Inventor: Manuel M. Saiz, Almeria (ES)

( * ) Notice: Subject to any disclaimer, the term of this patent is extended or adjusted under 35 U.S.C. 154(b) by 190 days.

(21) Appl. No.: 13/822,665

(22) PCT Filed: Apr. 12, 2011

(86) PCT No.: PCT/ES2011/000147
§ 371 (c)(1),
(2), (4) Date: May 3, 2013

(87) PCT Pub. No.: WO2012/035178
PCT Pub. Date: Mar. 22, 2012

(65) Prior Publication Data
US 2013/0251525 A1    Sep. 26, 2013

(30) Foreign Application Priority Data

Sep. 14, 2010 (ES) .................................. 201001236
Apr. 11, 2011 (ES) .................................. 201100468

(51) Int. Cl.
*B64C 29/00* (2006.01)
*F01D 5/00* (2006.01)
(Continued)

(52) U.S. Cl.
CPC ................ *F01D 5/00* (2013.01); *B64C 27/26* (2013.01); *B64C 27/30* (2013.01);
(Continued)

(58) Field of Classification Search
CPC ........... F01D 5/00; B64C 27/24; B64D 27/02; B64D 2027/026; B64D 41/00;
(Continued)

(56) References Cited

U.S. PATENT DOCUMENTS 3,490,720 A * 1/1970 Girard ...................... B64C 3/40
244/46
3,693,910 A * 9/1972 Aldi ............................. 244/7 A
(Continued)

FOREIGN PATENT DOCUMENTS

WO    WO 03035470 A1 *  5/2003
WO    WO 2004024558 A2 *  3/2004

*Primary Examiner* — Valentina Xavier
(74) *Attorney, Agent, or Firm* — Robert M. Schwartz; Thomas Hamill, Jr.

(57) ABSTRACT

Lift propulsion and stabilizing system and procedure for vertical takeoff and landing aircraft that consists in applying simultaneously and combined as lifters during the initial portion of the climb and at the end of the descent of: a) some fans or electric turbines, EDF, and b) at least one rotor with external blades and/or rotary and/or c) the engine flow directed downwards and/or d) pressure air jets injected on leading edges control fins, and/or e) water jets and/or f) supplemented with aerodynamic lift produced during frontal advance of the aircraft, the stabilization is achieved by the gyroscopic stiffness of the rotor and two or more lifting fans oscillating fins and/or air jets located on two or stabilizers more peripheral points in a plane perpendicular to the vertical axis of the aircraft.

7 Claims, 12 Drawing Sheets

(51) Int. Cl.
     *B64C 27/26*     (2006.01)
     *B64C 27/30*     (2006.01)
     *B64C 39/06*     (2006.01)
     *B64D 27/02*     (2006.01)
     *B64D 27/24*     (2006.01)
     *B64D 41/00*     (2006.01)

(52) U.S. Cl.
     CPC ...... *B64C 29/0025* (2013.01); *B64C 29/0083* (2013.01); *B64C 39/06* (2013.01); *B64D 27/02* (2013.01); *B64D 27/24* (2013.01); *B64D 41/00* (2013.01); *B64D 2027/026* (2013.01); *B64D 2221/00* (2013.01); *Y02T 50/62* (2013.01)

(58) Field of Classification Search
     CPC . B64D 2221/00; B64C 29/0083; B64C 29/00; B64C 29/0025; B64C 39/06; B64C 27/30; B64C 27/26; Y02T 50/62
     USPC .......................................... 244/7 A, 7 R, 34 A
     See application file for complete search history.

(56) References Cited

U.S. PATENT DOCUMENTS

| | | | |
|---|---|---|---|
| 6,450,446 B1 * | 9/2002 | Holben | 244/34 A |
| 7,874,513 B1 * | 1/2011 | Smith | B64C 29/0033 244/12.4 |
| 2007/0034734 A1 * | 2/2007 | Yoeli | B64C 27/20 244/12.1 |

* cited by examiner

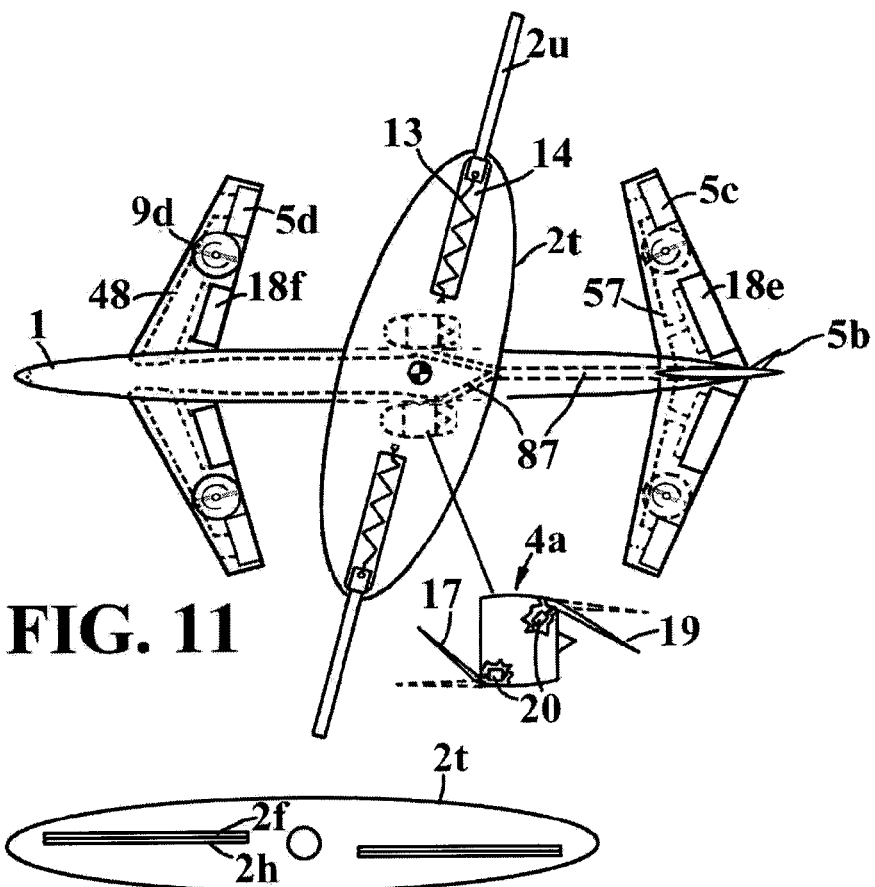
FIG. 11
FIG. 12
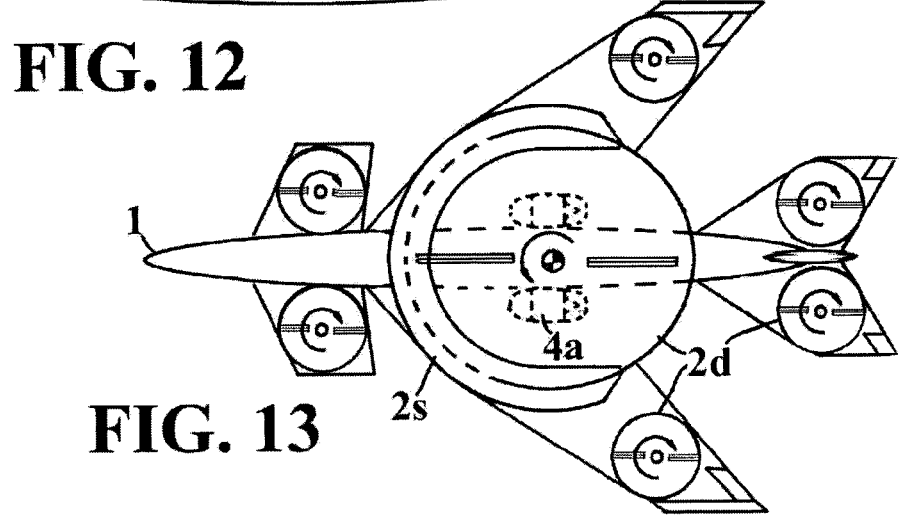
FIG. 13
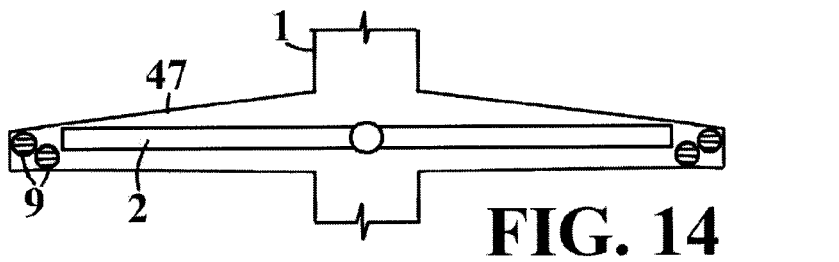
FIG. 14

LIFT PROPULSION AND STABILIZING SYSTEM AND PROCEDURE FOR VERTICAL TAKE-OFF AND LANDING AIRCRAFT

INDEX TO RELATED APPLICATIONS

This application claims the benefit of PCT application PCT/ES2011/000147, filed Apr. 12, 2011, which claims the benefit of Spanish patent application numbers, P201100468 filed Apr. 11, 2011 and P201001236 filed Sep. 14, 2010, the disclosure of which are incorporated herein by reference in their entirety.

FIELD OF THE INVENTION

In systems for lift, propulsion and stabilization of manned and unmanned aircraft, radio control, firefighting, photography, carrier aircraft, supersonic, ultralights, gliders, etc.

STATE OF THE ART

The present invention can be considered a continuation of the patent ES-201000248. Aircraft have less lift at low speed, they need maximum power, large wings and flaps for the takeoff and landing, they are dangerous because of their high speed close to the ground, they use heavy landing gears, large airports, expensive runways and do not performs vertical takeoff. Helicopters are slow, expensive, heavy, complex and have little autonomy. Current VTOL and SVTOL aircrafts, Harrier, V-22, etc. with adjustable nozzles or not, have little safety or are unstable and do not efficiently exploit the energy of the turbines at low height and at low speed. All are difficult to control. The invention solves these drawbacks mixing several systems to produce lift and stabilization.

OBJECTIVE OF THE INVENTION

Provide a VTOL system simultaneously using different lift, stabilization and control systems Allowing VTOL flight with great weight, range, speed, stability, smooth transition an safety although some lift components fail. It is more ecological, thus protecting the environment.

Use compressed air storage and simple and lightweight flywheels that allow to store and apply external and auxiliary power for VTOL mode.

Add lifting blade rotors or rotary wings.

Providing stability using rotors turning at high speeds, oscillating blades, rotors, fans, and air jets on the leading edge of the control fins.

Remove flaps, heavy and large wings and complex landing gear, complex systems and expensive airports.

Place gas turbines in or below the center of gravity of the aircraft in addition to typical locations. Use deflector flaps behind the turbines. Use turbofan engines that carry integrated hinged flaps.

Use turbo-shaft APU, turbines, mini-turbines, micro-turbines with permanent magnet generators powerful rare earth and powerful and light and high-rpm electric motors.

Fast loading and unloading batteries, fuel cells and ultracapacitors and powerful generators of high power/weight ratio.

DESCRIPTION OF THE INVENTION

Lift propulsion and stabilizing system and procedure for vertical takeoff and landing aircraft that consists in applying simultaneously and combined as lifters during the initial portion of the climb and at the end of the descent of: a) some fans or electric turbines, EDF, driven by electric motors powered or driven by flywheels, compressed air stored in the frame tubular hollow structure of the aircraft or in air or nitrogen bottle, GPU, Group tire, APU, turbo-shaft, or generators or supergenerators, fuel cells or batteries and b) at least one rotor with external blades and/or wings rotating at medium or high speed, powered or driven by flywheels, compressed air stored in the frame of the hollow tubular structure of the aircraft or air or nitrogen bottle, GPU, Group tire, APU, turbo-shaft, generators or supergenerators, fuel cells and batteries, electric, pneumatic, hydraulic or mechanical, and/or c) the engine flow directed downwards and/or d) pressure air jets injected on leading edges control fin, and/or e) water jets and/or f) supplemented with aerodynamic lift produced during frontal advance of the aircraft. On land is used preferably GPU and/or pneumatics to speed flywheels. Rising the aerodynamic lift will be increased smoothly and gradually to be equal to or greater than the weight of the aircraft. At that time, leaving only the standard or conventional configuration of aerodynamic lift and propulsion. In descent the aerodynamic lift is reduced until this is completely produced by the rotors and/or fans or vertical flow turbine and/or until the aircraft lands on the ground. The transition begins with the application of horizontal thrust, and the descent in the last leg and very close to the arrival on the ground. The descent and climb with low weights can be done vertically without the contribution of aerodynamic lift, that is to say propelling engines horizontally. Rotors, turbofan, turboprop or multiple fans apply its lift or its resultant preferably, near or above the center of gravity of the aircraft. Two or more lifting fans, flaps, oscillating fins or flaps, or air jets stabilizing or controllers are placed in two or more peripheral points in a plane normal to the vertical axis of the aircraft to stabilize it. Rotors at high speeds can also provide high stability for gyroscopic stiffness as they act as flywheels. Several lifting and/or stabilizing fans may be distributed through the different ends or periphery of the aircraft. The aircraft climbs with auxiliary power not used for propulsion nor for emergency till a low level where the high power propulsion and effective is initiated by not having to use the engines to lift. The lift can be increased by launching downward through nozzles, water stored in tanks and/or chambers of the flywheels, and driven by compressed air.

On this text are used external blades rotors, rotors of large blades as the helicopter rotary wing rotors or small blades rotors or small propellers. Using ducted propellers or fans, EDF, also called electric turbines in aircraft modelling, avoiding the word "fan" estimating is less appropriate.

The system can lift aircraft with high specific weight, the current average is about 200 kg/m$^3$ and can bend for example the A-321 which is about 150 kg/m$^3$. The rotors and flywheels apply, effectively, between 30 and 120 seconds, the energy they store on the ground and before takeoff. These rotors and flywheels can re-energize as they feed back or giving the stored energy.

The fans and rotary wing can be: Helical or lenticular, discoidal, lenticular with planeconvex surfaces, oval, oval with a planeconvex surfaces with inclined through-grooves and projecting attached fins or with inclined recesses parallel. The slots and fins may extend to the periphery. The helical one may be formed by one or two independent blades. The wings may be oval, rectangular or triangular with rounded corners and edges, rotating around its vertical axis, which is the symmetry one, and block in the position of conventional or transverse wings. The fins and/or grooves produce no torque nor or neither? resistance when they are stopped and aligned with the direction of flight. The fins can be either wider, higher or inclined the more closer are of the axis of rotation. The fins may carry a small fin in its innermost end and extend and rotate during the rotation of the wing by the action of air. The rotary and rectangular oval wings are equivalent to two wide-rotor blades, with rhomboidal or trapezoidal cross-sections and rounded corners, in which the lift is produced with inclined edges due to the high speed used. The trapezoidal cross-section one add between the trailing edge and the upper zone ducts and flexible flapper valves that open by suction may also be articulated and rotable sections of the edges of inlet and outlet of the fin with a strip which tends to keep high. These sections when rotating the blades are positioned horizontally by the action of ram air. Another variant uses a flap around the edge of the trailing edges, which when moving forward extend and deflects the airflow downward. Can be used also profiles NACA 0004 to 0008 or NACA 2204 to 2208 or NACA 2304 to 2308 or the like. The blades and vanes may be fixed and for the high speed used of very small thread pitch and generally of low thickness, thus offering little resistance or lift difference between them during horizontal flight. The rotary wing may carry multiple peripheral fins on which pushes or sucks air tangentially through a conduit from the turbofan, GPU and APU.

The wings can carry rotating radial blades, at least one of them extends automatically and centrifugally retracting by springs, in the case that only one is retracted, the other which is the opposite, remains extended and fixed, acting as a weathervane. The blades can also be extended by a motor or an actuator. One cannot fully collected, acting as a weather vane. The rotary wing during horizontal flight can be fixed or free and powered with engines. The two rotor blades and fans can be independent and turn to each other, when driven a blade with the drive shaft, the other is dragged at 180 by ratchets. At rest, automatically a spring and the ram air operate both blades like weather vanes. The blades are longitudinally or at the ends, edges and trailing aerodynamic profile 1.

One of the fans and rotor blades may be reduced in size or fins may have a blade, parallel or perpendicular to the plane of rotation and an internal counterweight in the opposite direction. Both blades have a similar thrust and a counterweight, and at rest they take the course on the ram air La aircraft can carry two side outer rails between the ends of two wing type canard and the horizontal stabilizers, or between four wings, which bear fans and rotors, at rest, they are inserted, are attached to them or are oriented as Weathervanes The rotary semilenticular wing has a convex upper face and the lower is flat or has a greater curvature, with profiles similar to the NACA 2206 and 2306. The rotor blades, the blades and vanes of the rotary wing and the rotary wing lenticular, discoidal, lenticular surfaces planeconvex, oval, flat-oval convex surfaces are preferably fixed, but may be tilt-able, with variable pitch and may or may not be twisted longitudinally. Las rotary wing after at rest are automatically routed leaving a blade or a portion of it extended or with an actuator, motor or ram, which holds or blocks an eccentric portion of the rotary wing shaft.

To the edge of the rotating wing may be added an airfoil which provides low drag, that consists of a supplementary profile, added: a) in a zone of the rotary wing, which will act as the leading edge thereof, with profiles NACA 2206 and 2306 or the like, b) in front of the rotary wing and attached to the aircraft fuselage with studs, c) in a wing which surrounds the rotary wing about its front third and in which is integrated aerodynamically or d) in delta rotary wing aircraft, aerodynamically integrates and forms part of the wing. La aircraft can take the form of conventional, triangular, flying wing, delta-wing or using four wings two front and two rear.

The electrical fans can rotate counter to the main rotor and at least one of the electric fans is rotatable or tilt-able, being used to support and/or propel during horizontal flight and to compensate the torque if fails one of the rotors.

The fans correct quickly and can be supplemented with air jets. The air jets may impact on the control fins used in conventional flight.

One or more fans or rotors driven by electric motors or oscillating fins in the tail, in canards wings and the wing tips stabilize about the transverse axis, vertical and lengthwise, and can be simultaneously lifters, stabilizers and thrusters. Can use axial or centrifugal axial fans. For correction must take into account the precession. Pairs of fans can be used in counter-rotation.

The aircraft can carry additional lifting and propulsion turbofan engines in peripheral or rear zones of the aircraft.

They propulsion engines can be rotated 90° around the transverse shaft driven by air pressure, some rods and pistons of cylinders, regulating the flow some valves or the flow can be launched on a baffle plate at the inlet and another at the output to direct it downward. The turbines with adjustable nozzles or vector may be placed below the center of gravity of the aircraft or close to this side and in the fuselage, but it can also be placed in the tail. The turbofan engines can add baffles consisting of one upper extension rearward from the cowl like a visor, and an extends at the front lower of the cowl articulated and rotatable 45 degrees or more about a transverse axis in its rear edge sucks the air from the upper zone during the vertical flight. The propulsion engines launch the flow over wing flaps or flaps aerodynamically compensated which rotated at least 45° about its axis deflect the turbine flow downward and slightly forward. Retractable rotary turbines rotate and extend out of the fuselage to propel, retracting and lodged in the fuselage when not used. Fins, plates, flaps or turbines are rotated with motors or actuators electric, actuators, pneumatic or hydraulic. 30. Can be used interchangeably turbofans, turboprops, alternative, electric turbines EDF, etc. The horizontal flight can be done only with turbo-shafts. The turbofan engines can be used as auxiliary source, APU, etc., as VTOL lifting mode, and as thrusters if other turbofan engines fail. They can be used interchangeably turbofan engines, turboprops, alternative, electric fans EDF, etc.

The electric motors of each zine can be supplied from independent sources. The rotary wings type flywheel can be compact or hollow and store energy that is applied with mechanical, hydraulic, pneumatic or electrical transmissions, of the gas turbines and ground cart, APU or turbo-shaft with or without clutches. Secondary rotors can be used on the wings, stabilizers and canards wing counter-rotating main. All provide great horizontal stabilization.

Two bladed rotors or rotary wings in counter rotation can be used, the latter with their extensible fins or paddles. Said blades or wings can be attached to each other and longitudinally to the fuselage by a dovetail wedge shaft or outer shaft. You can add a small third rotor to correct and stabilize the course.

At least one rotor and engine can be attached or placed longitudinally on and/or under the fuselage, wings and the horizontal stabilizer and/or archival aerodynamic elements or ribs arranged parallel to the longitudinal axis of the aircraft with some front wings and or other rear or horizontal stabilizers, may project, extend or prolong backwards from the trailing edge and/or forward from the leading edge. The blades may have more external points or zones slightly inclined towards the fuselage, to which are attached when the rotors are retracted.

La aircraft can take the form of a saucer with two rotary wings in the form of spherical caps in counter-rotation and between them the fuselage, which carries the turbines and adopts lenticular-annular with its central hollow part to allow air flow circulates created by the fins and the rotary wing slots, or bearing a semi-oval fuselage at the bottom under both wings.

A variant has the rotary wing in the form of spherical caps nd in counter-rotation and with radial blades, the semi-oval fuselage shape is placed at the bottom and is mechanically driven by the turbine. The stability is controlled by air jets. Air enters through the top and is thrown centrifugal and axially downward.

The flywheels can be compact or with a chamber of water or other liquid inside that is used as inertial mass, and can be divided by one or more internal diametrical partition, being driven or powered GPU, APU or turbo-shaft, turbofan engines, turboprop or connection to a connector on the ground at the place of departure and a mechanical transmission hydraulic, pneumatic or electric and related engines and in emergency batteries of rapid charging and discharging, fuel cells and ultracapacitors and electrical generators of high power/weight ratio. These flywheels are applied or feed to the rotors of blades and flying wings, and to electrify fans by generators and electric motors or hydraulic or mechanical installations and clutches and RPM gearboxes. Multiple rotary wing rotors, are comparable to the flywheels and can be used integrated into longitudinal wings on the sides of the fuselage, or in the wings, canard wings and horizontal stabilizers of conventional aircraft, delta or flying wings. The water used can be launched thrown to the exterior downward by air pressure, using the force of reaction that is created by a valve which is actuated electrically. Water is recovered during or after flying through water separators of the turbine. Speed reducers reduce the RPM of the flywheels, and their shafts are coupled and drive the rotors increasing its energy and lift. The flywheels may have a rotation axis parallel to the transverse axis of the aircraft, or parallel to the vertical axis and rotate counter to the main rotor. They are used electric motors of rare earth permanent magnets, neodymium iron boron, samarium cobalt or the like, the generator rotates at the high speeds of the turbines, miniturbines, etc. applying directly to, or via a small RPM reduction: The high frequency current generated is rectified and applied to a DC motor, or low frequency AC by an inverter. The high or fast response of the electric fans facilitates the corrections in case of turbulence, this is done by adjusting the frequency, voltage or current intensity. Inrunners or Outrunners motors are used.

The electric hydraulic or pneumatic motors reinforce the mechanical, electrical etc. energy, applied to rotary wings, rotors and flywheels. The energy of ultracapacitors can be used to power military aircraft, directed energy weapons: solid state lasers and high power microwave rays. A gearbox facilitates the sum of the energies of the individual axes or engines and applies to a common shaft of the rotors and fans. If rotating wings or rotors are driven by electric motors, this energy is added directly to them. The electrical motors can apply the stators of several motors on the shaft of the rotors.

In takeoffs external electrical power can be applied by a long cable, that may be supported by a long post or by a captive balloon. A mother aircraft can feed electrically the aircraft during the climb. It can be powered electrically by the electrical cable from a helicopter. It can be fed electrically through two electric cables by slip rings or hooks with brushes that slide on power cables supported between posts. An electric cable can be used supported by a rotating arm on a tower supported by one captive cable. In all cases the electrical cables are quick release.

The air pressure cylinders and the shell of the hollow tubular structure of the aircraft impulse turbines that drive directly powering the rotors, fans or some electric generators. They recharge with air pressure during flight. The pressurized air can also be injected with control and stabilization fins and on the flaps and elevators to produce lift. Using compasses, GPS, gyroscopes and accelerometers detect elevation changes, the horizontal attitude and heading, generating signals in a microprocessor or microcontroller, with the corresponding software, acting on electric motors and servo drives fans, fins, airflow or flight controls.

EDF fans can use shutters, the upper consist of tilting fins about an eccentric axis that open with the fan flow and close with the ram air, remaining horizontal by abutments when closed. The one of the lower consists of flexible or rigid fins that rotate around an edge and also automatically open with the air flow of the fan and close with the ram air. The electric fans are replaced by small rotary wings or discs, fins and grooves, whose surface is flush with the wing, fin or fuselage.

Can be used airs of flywheels spinning in opposite direction to avoid the gyroscopic effect or turn it counterclockwise to the main rotor, using reversible motor-generator integrated in them with rare earth permanent magnets, neodymium iron boron, and the rotor of fibers or pieces of fabric or carbon, or glass or silicon carbon nanotubes. The flywheel, the rotor shaft and the motor generator can form a single piece.

A variant uses a rotary wing with radial fins on one side and a housing or cover with a spherical cap shape, with a center hole or radial grooves upper air inlet, the airflow flowing between them and centrifugally thrown out and then axially down by the lower sides. The rotor blades, rotary wings, flywheels and the rest of the aircraft structure can be of carbon fiber or glass fiber, composite material or woven fabric embedded in a plastic matrix, epoxy, etc. fiberglass, carbon, glass, aluminum, graphite, Kevlar, Kevlar and the like, also used in the tubular structure and compressed air cylinders, blades, rotary wings and flywheels. The intersecting fibers may be woven or wound to 30, 45 or 90° each other. They can used silicon or carbon nanotubes. Using plates or pieces of carbon and/or glass fiber fabric alternated and embedded in a plastic matrix, epoxy, etc. 47. The flywheels can rotate in vacuum chambers, and used these rotors and preferably high-speed bearings ceramic ball or the like for its simplicity, low weight and cost, since due to the short time of use, the heating that occurs is minimal. Also may be refrigerated before takeoff with nitrogen liquid. The flywheels can use air or magnetic bearings. Main rotor can rotate between 200 and 5000 RPM and the flywheels between about 2000 and 120,000 RPM. depending on its dimensions and its use.

BRIEF DESCRIPTION OF THE DRAWINGS

FIGS. 3, 15 and 16 show schematic and elevation and partial cross-section views of aircraft variants.

FIGS. 11, 13, 17, 18, 19, 20, 21, 22, 23, 28, 28A and 29 show schematic and plan views of variants of aircraft with the system of the invention.

FIGS. 12, 24 and 25 show plan views of variants of rotating wings.

FIG. 14 shows a plan view of upper wings and a rotor.

FIG. 35 shows a view of a rotor portion of the rotary wing.

MORE DETAILED DESCRIPTION OF THE INVENTION

Figure 1:
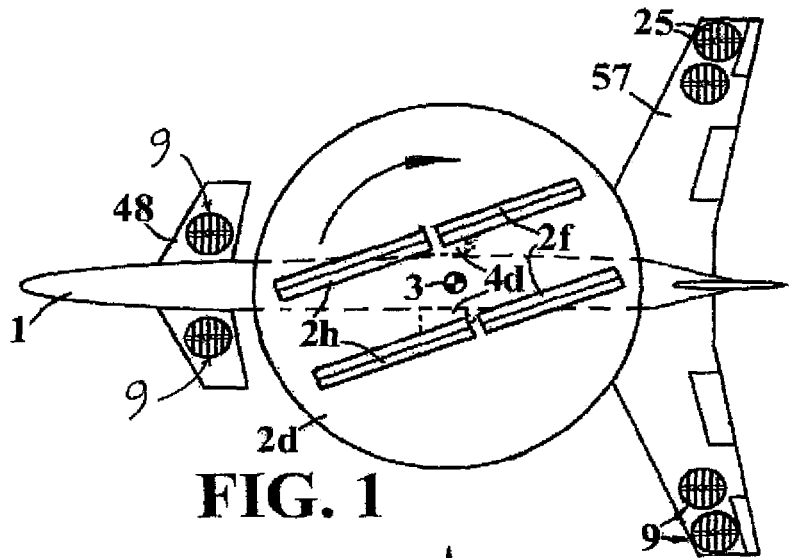
FIG. 1 shows a schematic and a plan view of an aircraft with the system of the invention.

The invention, FIG. 1 shows the fuselage (1) of the aircraft, the lenticular wing, lifting and rotatable around its axis of symmetry (2d) which carries the protruding fins (2h) and the grooves (2f) and rotates supported and driven by the shaft (3). It uses pairs of stabilizing and lifting fans (9) with the shutters (25) in the canard fins (48) and the stabilizer fins (57) and rotating or tilting turbofans (4d). The rotary wing is mechanical, pneumatic and/or with flywheels, APU, propeller engines, batteries, etc. The rotary wing may be replaced by a two-bladed rotor, preferably rigid.

Figure 2:
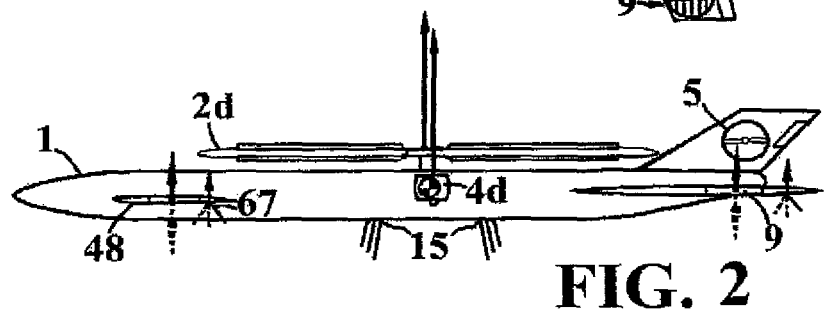
FIGS. 2, 3, 22, 27 and 30 show schematic and elevation views of aircraft with the variants of the invention.

FIG. 2 shows the fuselage (1) the rotary lifting lenticular wing (2d), the tilting turbofan (4d) pushing the flow downward, the canard fin (48), the oscillating fin (67) which can be propelling, the fan (5) compensates the torque of the rotor, the fans (9) acting in both directions. The arrows show the lift and stabilization forces. It can add a nozzle (15) through which pressurized water is thrown downwards.

Figure 3:
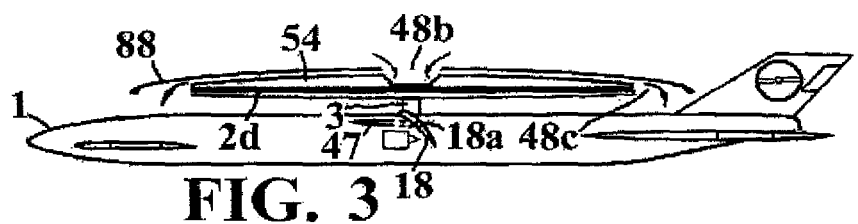
Figure 4:
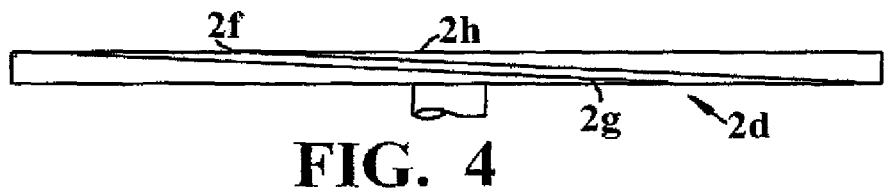
FIGS. 4 and 5 show elevational views of helical wings or fans.

FIG. 3 shows the fuselage of the aircraft (1), the shaft (3) of the rotary lenticular wing (2d) with lateral radial fins (54) and covered with the cap-shaped case (88). The airflow is sucked through the upper hole (48b) or radial grooves not shown in the figure, being thrown centrifugally between the case and the rotary wing (2d), exiting at the lower peripheral opening (48c). This wing arrangement can be integrated into a delta wing fuselage or similar. The aerodynamically balanced flap (18) rotated at least 45° about its axis (18a) and directs the flow downward and slightly forward, producing part of the lift. FIG. 4 shows the helical fan or the lifting rotating wing (2d) with the upper fin or leading edge (2h), the lower fin or trailing edge (2g) and the inclined groove or channel (2f) created therebetween. It has horizontal and parallel faces. Can be formed by one or two independent wings or blades.

Figure 5:
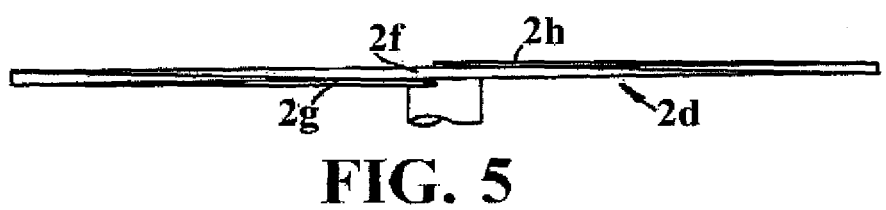

FIG. 5 shows the helical fan or lifting rotary wing (2d) with the upper blade or leading edge (2h), the lower wing or trailing edge (2g) and the inclined groove or channel (2f) created therebetween. Both wings protrude upward and downward respectively. Can be formed by one or two independent wings or blades.

Figure 6:
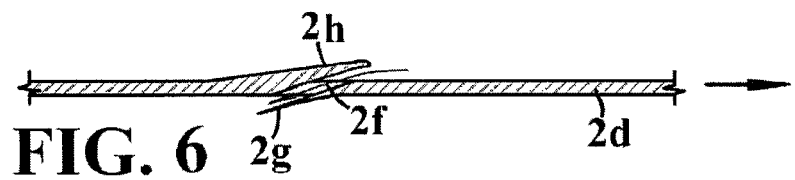
FIGS. 6 and 7A show schematic, partial and cross-section views of rotary wing variants.

FIG. 6 shows the portion of the lifting rotary wing (2d) with the upper fin (2h), the lower fin (2g) and the inclined groove (2f). The arrows show the movement of the wing and the air flow through the roof. A fin may be optional.

Figure 7:
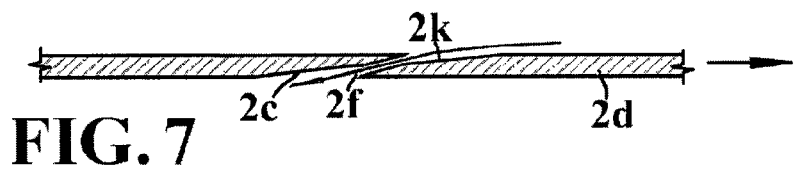

FIG. 7 shows the portion of the lifting rotary wing (2d) with the inclined groove (2f), with the upper recess (2k) and the bottom (2c). A recess may be optional.

Figure 7A:
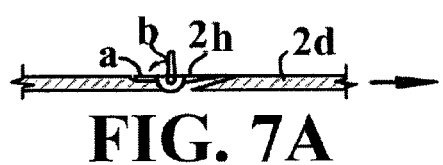
Figure 8:
FIGS. 8, 8A, 8B, 8C, 8D, 8E, 8F and 35 show schematic and cross-section views rotor blades or rotary wing.

FIG. 7A shows the retracted inclined flange (2h) by the strap (a), which extends and rises when rotating the rotary wing (2d) and pressing the air on the small fin (b). FIG. 8 shows a rotor blade or the rotary wing of the rectangular or oval type (2m) rhomboidal section, that generates the lift by their inclined edges and the high rotation speed. The inclination of the edges depends on the speed of use.

Figure 8A:
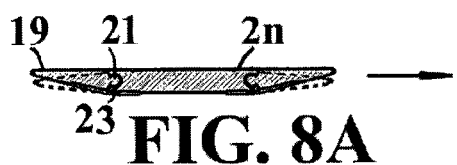

FIG. 8A shows a rotary wing blade of rectangular type, flat-oval convex surfaces (2n) of trapezoidal section, which generates the lift by their inclined edges and the high speed of rotation. This is equal and symmetric to the opposite blade, perpendicular to the plane which separates them. The inclination of the edges depends on the rate of use. The articulated segments (19) rotate around shafts (21) with the strips (23) which tend to keep them elevated. The delayed section is placed horizontally under the action of airflow.

Figure 8B:
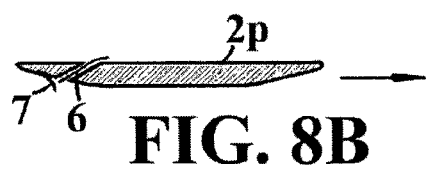
Figure 8C:

FIG. 8B shows a rotary wing blade of trapezium section (2p), which adds in the back and communicating with the upper edge one or more ducts (6) with flexible flap valves (7) which open for suction of the air flow. FIG. 8C shows a rotary wing blade of a trapezium section (2q), which adds in the back and communicating with the upper edge one or more ducts (6) with flexible flapper valves and angular (8) that open by the suction of the air flow.

Figure 8D:

FIG. 8D shows a rotor blade or of cross-sectioned rotary wing, of symmetric profile (2i), NACA 0002 or the like, for high speed.

Figure 8E:

FIG. 8E shows a rotor blade or of rotary wing cross-sectioned of profile (2j) NACA 2202 or the like, for high speed.

Figure 8F:

FIG. 8F shows a rotary wing blade of Trapezium section (2r) with rotating fin (7a) in the trailing edge ridge that retracts when the air gets front and extends if trailing edge acts of sending the air and producing lift.

Figure 9:
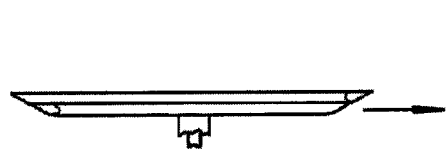

FIG. 9 shows two rotors in counter-rotation of trapezoid cross-section and in counter-rotation, and terraced.

Figure 10:
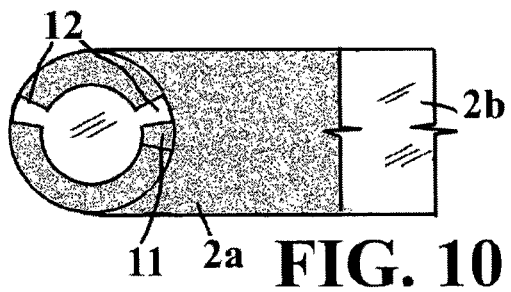
FIGS. 10 and 10A show variants sections of extendable rotor blades.

FIG. 10 shows the lower blade (2b) attached to the drive shaft with the ratchet (12) abutting with the tooth (11), this is part of the outer shaft (2a), a spring and the action of the ram air keeps it at rest. When the shaft is driven, the upper blade (2a) is delayed and abuts with the opposite ratchet (12). Can be used with rotors and fans.

Figure 10A:
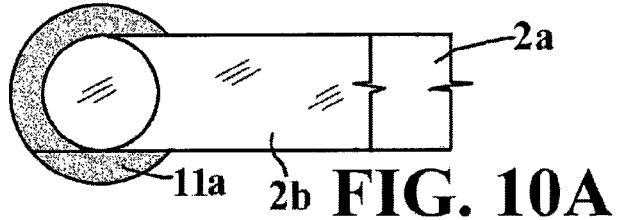

FIG. 10A shows the lower blade (2a) forming part of the external shaft and the ratchet (11), at rest this ratchet abuts with the upper blade (2b) attached to the inner and driver shaft. When the shaft is driven, the lower blade (2a) is delayed and abuts on the opposite end of the ratchet (11). Can be used with rotors and fans.

FIG. 11 shows the fuselage of the aircraft (1), the rotary oval wing (2t) with blades (2u) extending automatically by centrifugal force, pulling the spring (13) in the housing (14), the turbofan (4a) with deflecting blades integrated into the cowl, the front or lower (17) and the upper or rear (19) driven by actuators (20), the stabilizing fans and/or lifters (9d) on the canard fins (48) and stabilizer (57). By conduit (87) air is blown from the turbines and the one stored on the control and stabilization fins (5b, 5c and 5d), the flap (18f) and the elevator (18e) and counteracts the torque of the rotary wing during the vertical flight.

FIG. 12 shows a rotary oval wing (2t) with fins (2f) and grooves (2h). This type of wing is positioned longitudinally above the fuselage of the aircraft.

FIG. 13 shows the fuselage of the aircraft (1), the turbofan (4a), the lenticular rotor (2d): the main, two on the canard fins, two on the wings and two on the stabilizers, that rotate in opposite direction to the main providing horizontal stabilization. The wings are part of the fixed airfoil (2s) in front of the main rotary wing. All rotors maintain its plane of rotation and stability with minimal resistance because they are integrated in the wings or flaps of the aircraft. They are used as flywheels.

FIG. 14 shows the aircraft fuselage (1) delta wing type, the rotor blades (2) superposed and housed in the wings (47) and the stabilizing fans (9).

Figure 15:
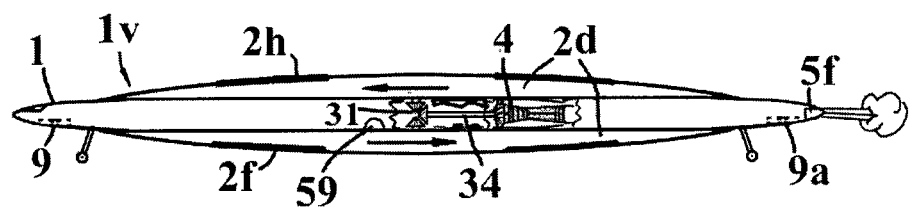

FIG. 15 shows the fuselage (1) of an aircraft type flying saucer with its rotary wings in the shape spherical caps (2d) in counter rotation on both sides of the fuselage, which adopts the lenticular-annular shape with the hollow central zone to let circulate the air stream created by the fins and grooves (2h and 2f) of the rotary wing. The wings are driven by the turbine (4), the shaft or propeller shaft (34) and the set or gearbox (31). The stabilization is effected with the fans (9 and 9a) and/or the air jets (59) and heading control with the fin (5f).

Figure 16:
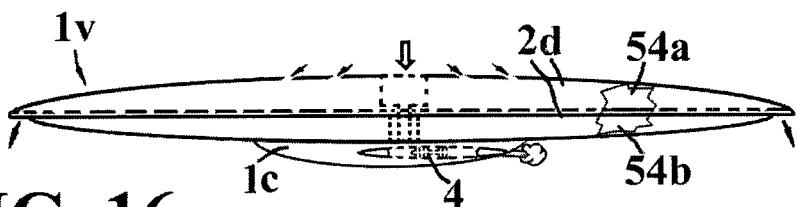

FIG. 16 shows the fuselage (1b) of an aircraft flying saucer type with rotary wings in the shape spherical caps (2d) in counter rotation with radial blades (54a and 54b), the fuselage (1c) of semi-oval shape is placed in the lower zone and are mechanically driven by the turbine (4). The stability is controlled with air jets. The arrows show the air inlet and centrifugal and axially launch.

Figure 17:
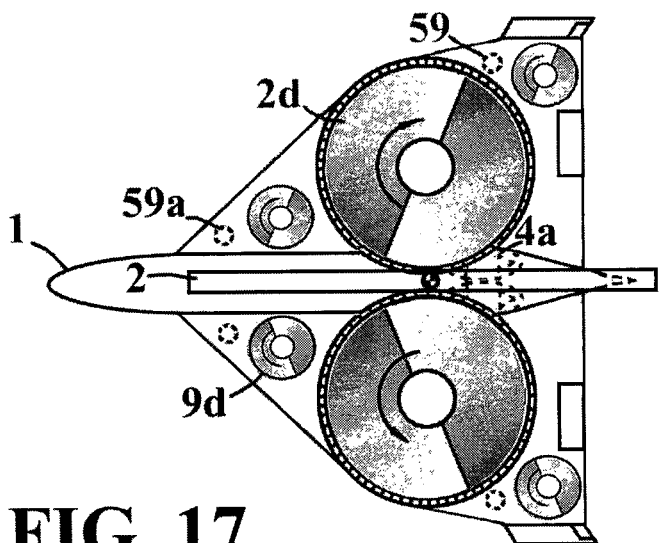

FIG. 17 shows the fuselage (1) of the delta wing aircraft with two rotating helical wings (2d) integrated, each with two independent blades and in counter rotation to eliminate torque, the optional rotor blade (2), the turbines (4a) with integrated deflecting fins and fans (9d) and air jets (59 and 59a) stabilizing and lifters. The rotor blades are attached to the fuselage in level flight when the rotor is lowered.

Figure 18:
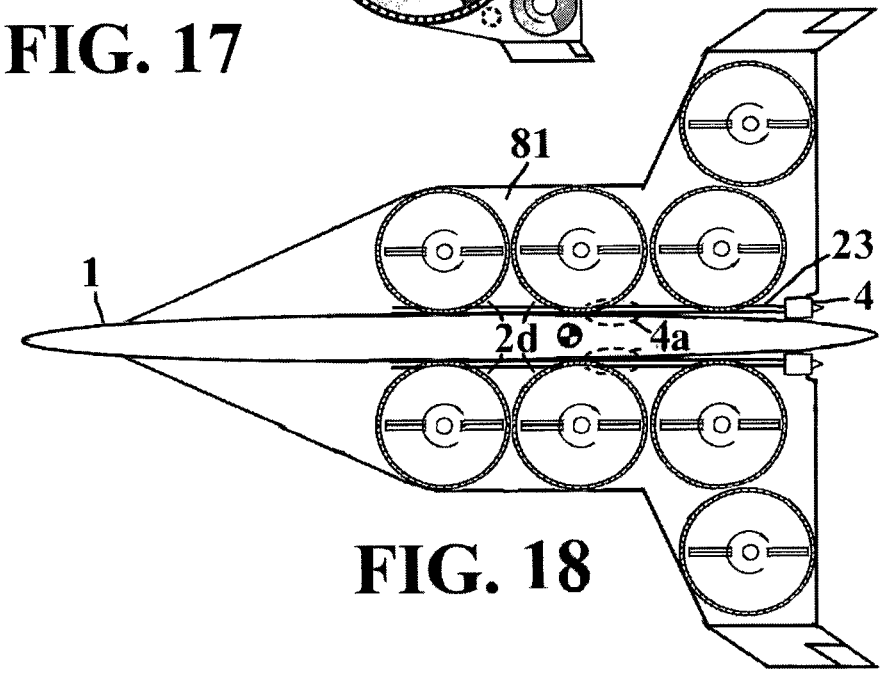

FIG. 18 shows an aircraft with eight flywheel rotors (2d) integrated into the longitudinal wings (81) on the stabilizer and on the sides of the fuselage (1) driven by the flow of the turbine (4) through conduits (23) and turbofans (4a).

Figure 19:
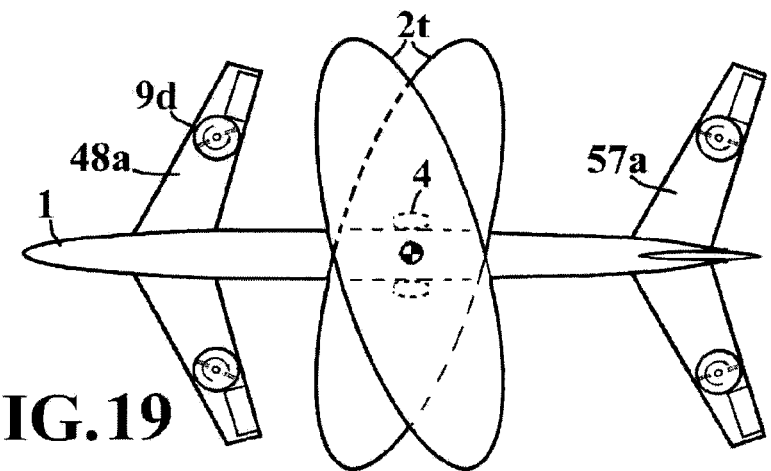

FIG. 19 shows the fuselage (1) of an aircraft of the type of four fix wings, two front fixed wings (48a) and two rear (57a) with two oval or flat-oval canvesas rotary wings (2t) in counter rotation between the four wings. It produces the lift with the inclination of the edges of each of the two blades in which are divided or with extendable blades, fins, recesses or slots are not shown. Add the turbofan (4) and fans (9d).

Figure 20:
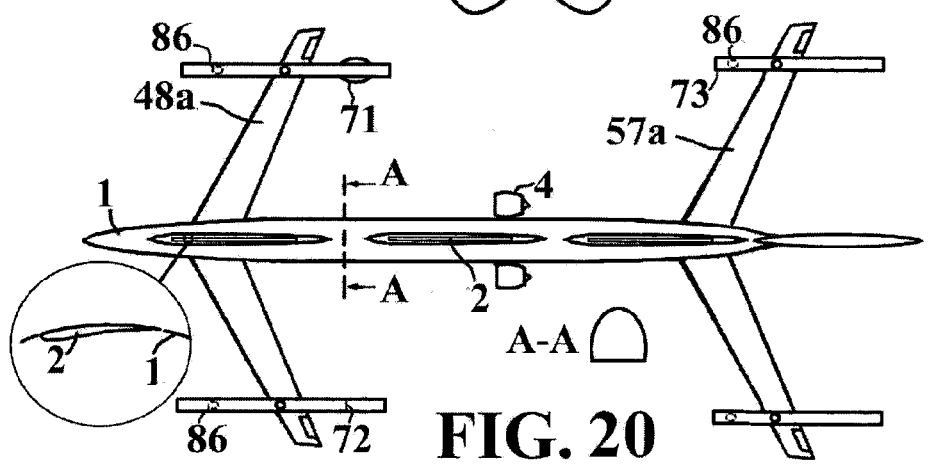

FIG. 20 shows the fuselage (1) of an aircraft with two front wings (48a) and two rear (57a), gas turbine (4). Carrying on and under the fuselage and rotors and at the tips of the wings. Enlarged is sown a cross-section of the special blade of the fuselage rotors. The front propeller blades carry an internal counterweight (86) in a blade and in the other lateral fins (71) or transverse (72). The rear propeller has one of the blades of smaller dimensions offset by counterweights (86) and are aerodynamically with greater surface or angle of attack. The cross-section AA shows a cross-section typical of fuselage, with the flat base. The rotors can be replaced by rotating wings.

Figure 21:
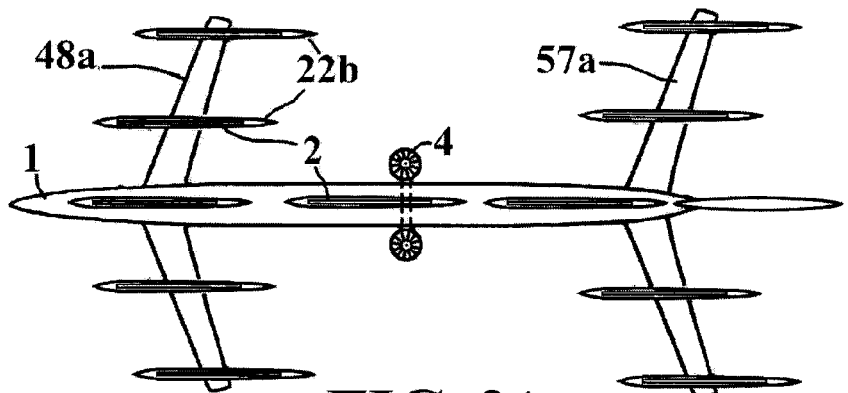

FIG. 21 shows the fuselage (1) of an aircraft with two front wings (48a) and two rear (57a), gas turbines (4) carrying on and under the fuselage and the oval elements (22b) the protruding oval elements by the leading edge and trailing edge of the wings, where are attached or inserted rotors (2). The more external rotors are stabilizers.

Figure 22:
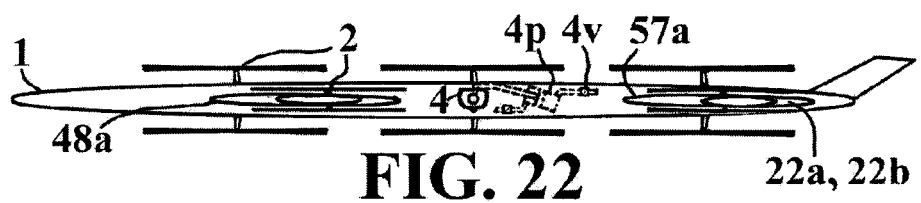

FIG. 22 shows an aircraft with front and rear wings (48a and 57a), carrying on and under the fuselage (1) and the rotors and wings (2), oval elements (22a, 22b). gas turbines (4), rotated 90° driven by the rod and piston of the cylinder (4p) and the pressurized air delayed by the valves (4v). The more external rotors are stabilizers.

Figure 23:
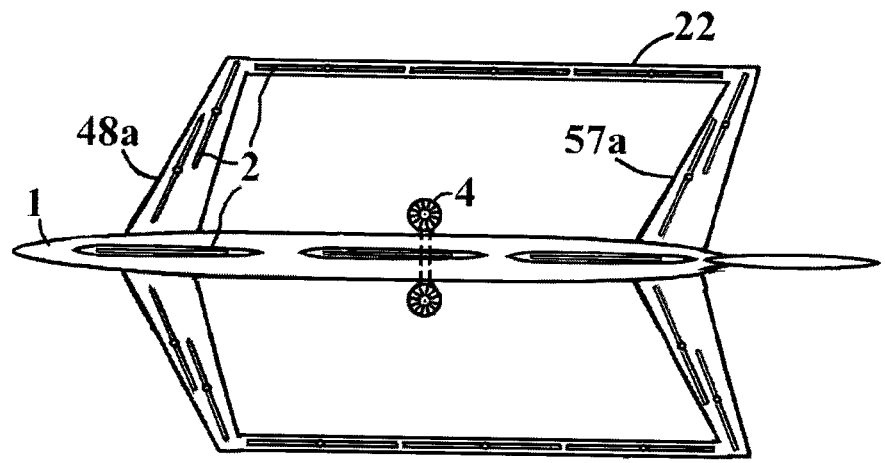
Figure 24:
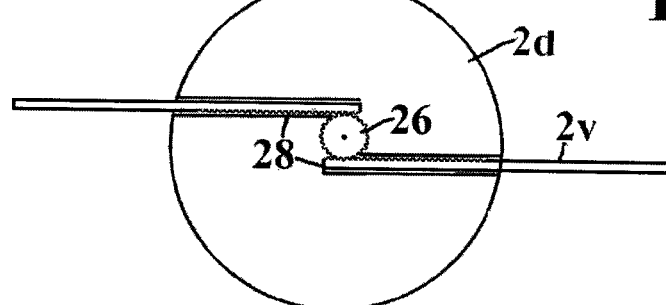

FIG. 23 shows an aircraft with front and rear wings (48a and 57a), gas turbines (4), carrying attached or introduced longitudinally above and below the fuselage (1), wings and stringers (22) the rotors (2). The more external rotors are stabilizers. FIG. 24 shows the rotating wing (2d) with extendable blades or vanes (2v) which extend when actuated the rotor rotating the pinion (26) and with this the sliding or linear pinions (28). Reversing or reducing the speed of the pinion the blades retract. The more external rotors are stabilizers.

Figure 25:
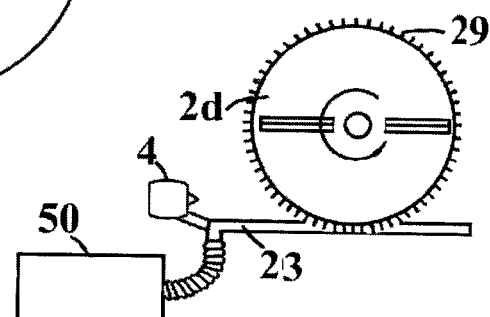

FIG. 25 shows the rotary wing, of the type flywheel (2d) driven by the GPU air (50) and/or turbofan (4) and the duct (23) on the peripheral fins (29).

Figure 26:
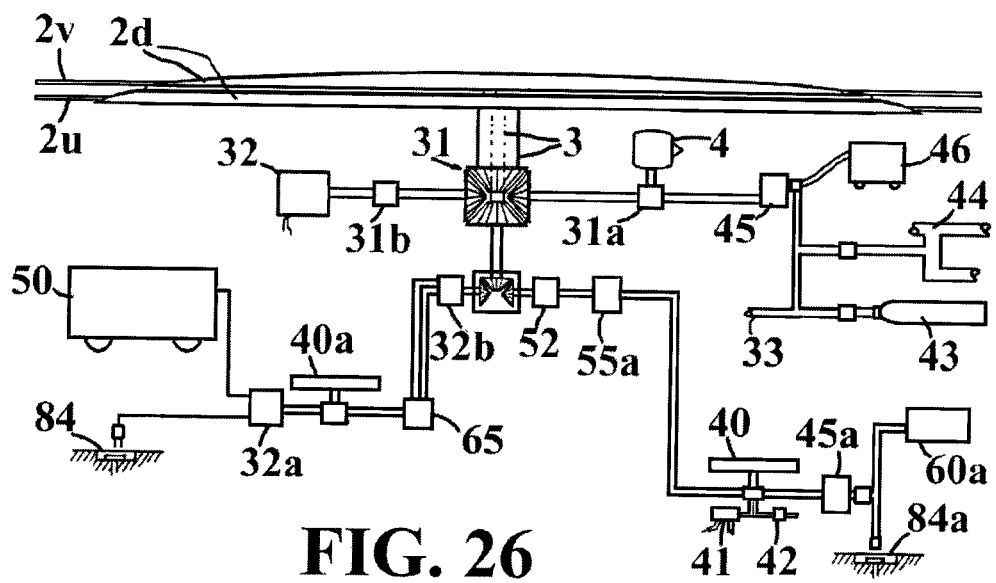
FIG. 26 shows an elevational view of a rotary wing and related systems.

FIG. 26 shows the rotary wings (2d) in counter rotation, with extendable blades (2v and 2u), driven by the gas turbine (4), the electric motor (32), the additional flywheel (40) driven by the APU (60a) or pneumatic of the ground installation (84a) which drive the turbine (45a) through the gear (55a). The flywheel can be filled and emptied with the water pump (41) and the electro-valve (42), the water is discharged at high speed downwards. The ground cart (50) and the electrical connection to the ground installation (84) on the ground drive the electric motor (32a) which accelerates the flywheel (40a) and from this is fed the electric motor (32b) which drives the shafts (3) via the gearbox (31). Displays optional clutches (31a, 31b and 52). From the tubular structure (44), pneumatic group (46) and compressed air cylinders (43) compressed air is sent to the turbine (45) to mechanically actuate the rotary wing. The compressed air is sent through the pipe (33) to push the water stored in a reservoir or in the flywheels chamber, throwing abroad by the nozzles (15) of the FIG. 2.

Figure 27:
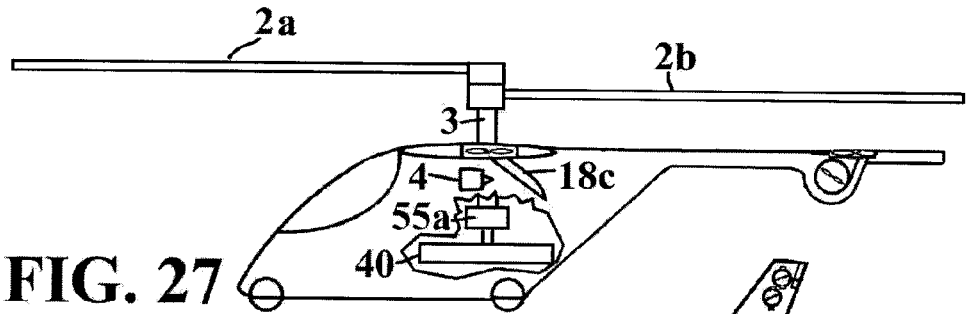

FIG. 27 shows an aircraft with the axis (3) of a rotor consisting of two extended independent blades (2a and 2b) extended, driven by the flywheel (40) complementary, which rotates counter to the rotor and is attached thereto by the speed reducer (55a). The turbine (4) drives the flow over the wing flap (18c).

Figure 28A:
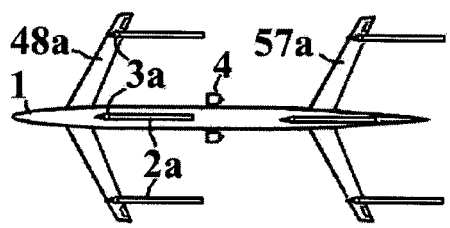
Figure 28:
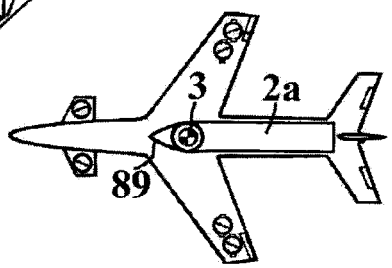

FIG. 28 shows an aircraft with two blade rotor (2a) wide and independent routed backwards by the action of the ram air, rotating around the shaft (3). The blades are formed longitudinally with aerodynamic profile, as shown by the leading edge (89). FIG. 28A shows the fuselage of the aircraft (1), the turbofan (4) and the two-bladed rotors (2a) independent, which rotate around the shafts (3a) and are routed backwards by the action of the ram air. They are mounted along the fuselage and of the four wings (48a and 57a), above and below them.

Figure 29:
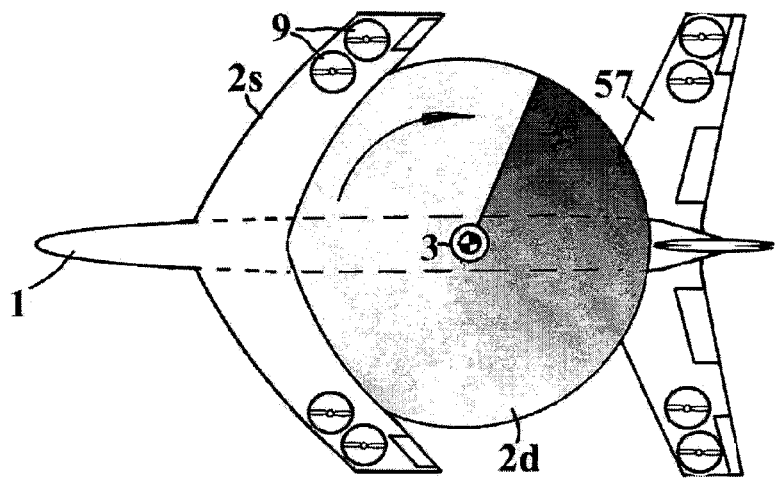

FIG. 29 shows the fuselage of the aircraft (1), the helical or lenticular wing (2d) and its shaft (3). Add the fans stabilizers and/or lifters (9) on the stabilizer fins (57) and on the front wing forming the airfoil (2s) for the rotary wing. The wing can be driven mechanically or pushing air with inclined nozzles from the wing or front profile and impacting on peripheral fins.

Figure 30:
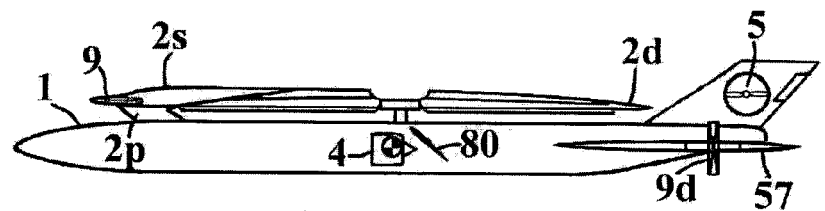

FIG. 30 shows the fuselage of the aircraft (1), the lenticular rotary wing (2d). Add the fan (5) that counteracts the torque of the rotary wing and stabilizes the course and the rotating fans (9d) propelling the aircraft, gas turbines (4), the small deflecting wings (80) and the stabilizing and/or lifting fans (9) on the front wing that forms the airfoil (2s) and fins (57). The profile (2s) is supported by the upright (2p).

Figure 31:
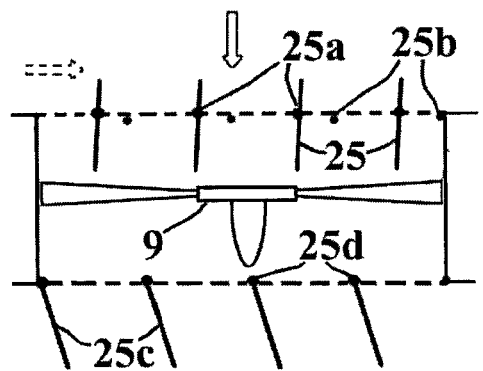
FIGS. 31, 32 and 33 show a partial and cross-section view of fans variants.

FIG. 31 shows the fan (9) and in the upper zone the shutter formed by the tilting blades (25) around the eccentric shaft (25a) which opens automatically with the fan flow and closed by the ram air which impact on the fins of less surface in which divides the shaft, the stops (25b) hold them horizontally when closed. In the lower zone are placed flexible or rigid fins (25c) and tilt-able by the rotational shaft (25d) at an edge which likewise open to the flow of the fan and close with the ram air. The support struts are not shown.

Figure 32:
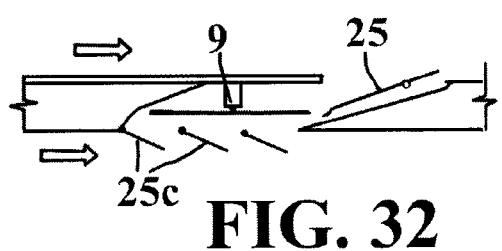

FIG. 32 shows a wing or fin with the fan (9) sucking air automatically by opening the upper tilting and eccentric fin (25). In the lower zone has the fins (25c) that open to the flow of the fan air and close with the ram air.

Figure 33:
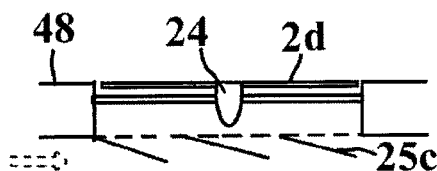

FIG. 33 shows the fin (48), the motor (24), the rotary wing fan (2d) and the flexible or rigid and tilting fins (25c).

Figure 34:
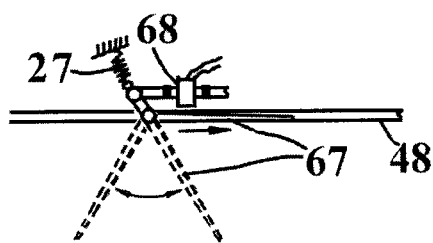
FIG. 34 shows a partial cross-section view of an oscillating fin.

FIG. 34 shows on a wing or fin (48) oscillating fin (67) retracted by the action of the ram air, the electromagnet (68) that actuates it during the vertical flight, dashed lines, and the spring (27) that places it vertically with the aircraft is static.

Figure 35:
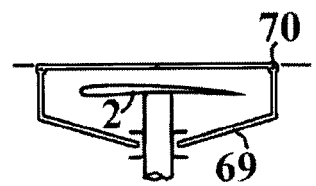

FIG. 35 shows the fan or rotor (2), which on extending automatically drags and opens the two halves of the gate (69) that rotate around the shafts (70).

Figure 36:
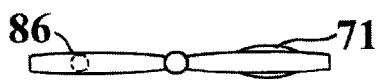
FIGS. 36, 37 and 38 show views of propellers or rotor fans.

FIG. 36 shows a propeller with a few extensions (71) on one of the blades and the counterweight (86) on the opposite. The blade with the extension (71) acts as a weather vane.

Figure 37:
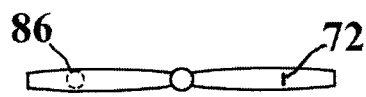
Figure 38:
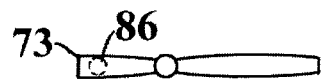

FIG. 37 shows a propeller with a small transverse fin (72) on one blade and the counterweight (86) on the opposite. The flap with the fin(72) acts as a weather vane FIG. 38 shows a propeller that has a blade (73) shorter, with the counterweight (86) and a larger angle of attack. Reducing this can become bladed propeller. The longest blade acts as a weather vane.

Figure 39:
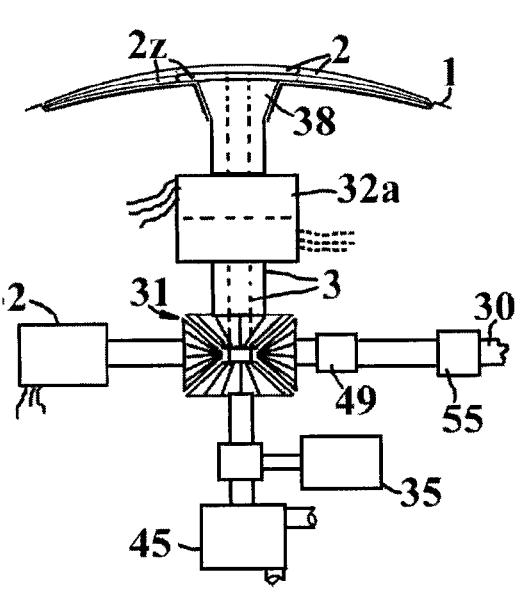
FIG. 39 shows a variant of a drive assembly of a rotor

FIG. 39 shows the upper blades (2) and the lower (2z) the rotor shafts (3) in counter rotation, longitudinally striated and sliding together, reduce gears (31), the main shaft (30) and the reduced speed (55) when the clutch is operated (49), the electric motor (32a) drives the outer rotor and through the gears the internal and also the supplementary electric motor of reinforcement and security (32). May be added in the lower area (32a), dashed lines to drive the internal rotor. The rotor blades are attached to the fuselage in the mode of horizontally advance, compressing a spring between them. The section (38) of the outer shaft is wedge-shaped for insertion into the housing of the same shape of the fuselage (1). If they are wings remain separated and perpendicular wings to the fuselage. At rest the actuator (35) presses on a section of the eccentric rotary wing shaft directing these and/or grooves and fins with the longitudinal axis of the aircraft. The air turbine (45) driven with compressed air bottles and hollow structure, etc. drives the inner shaft (3) of the rotor. The optional spring separates the rotors from each other during rotation thereof, an actuator compress and joins both wings or blades forming a single wing during flight. During climb the aircraft adopts a rise angle of the nose down to advance horizontally to the horizontally the rotating wings, and longer still, stay positive angle. to advance horizontally to the rotating wings and fixed now, left with positive angle. An actuator not shown raises and lowers the rotors.

Figure 40:
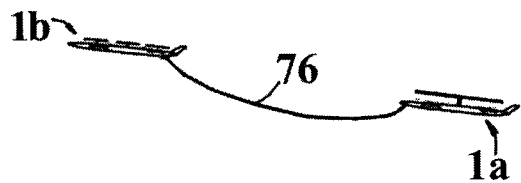
FIGS. 40 through 43 show views of complementary electrical supply systems.

FIG. 40 shows the aircraft (1c) electrically powered by the power cable (76) from the helicopter or aircraft (1a). The latter can be a ground vehicle.

Figure 41:
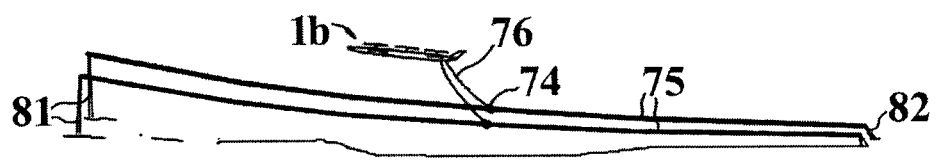

FIG. 41 shows the aircraft (1b) electrically supplied with electrical cables (76) through the slip rings or hooks with brushes (74) which slide on the power cables (75) supported between the posts (81 and 82).

Figure 42:

FIG. 42 shows the aircraft (1b) electrically supplied with the cable (76) supported by an arm rotable about the tower (77).

Figure 43:
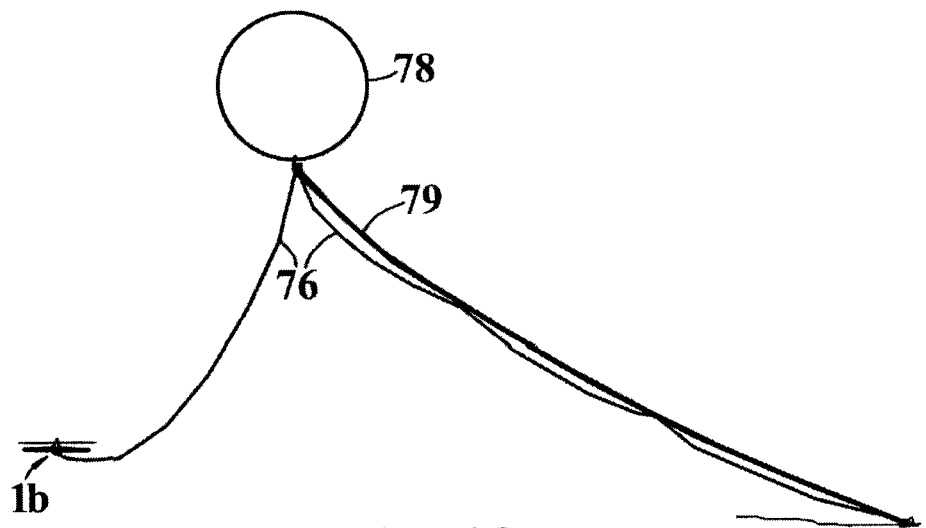

FIG. 43 shows the aircraft (1b) electrically supplied with the cable (76), which is supported by a captive balloon (78) attached or anchored to the floor by the cable (79). The aircraft of FIG. 40 to the 43 is disconnected when reaching certain speed.

Figure 44:
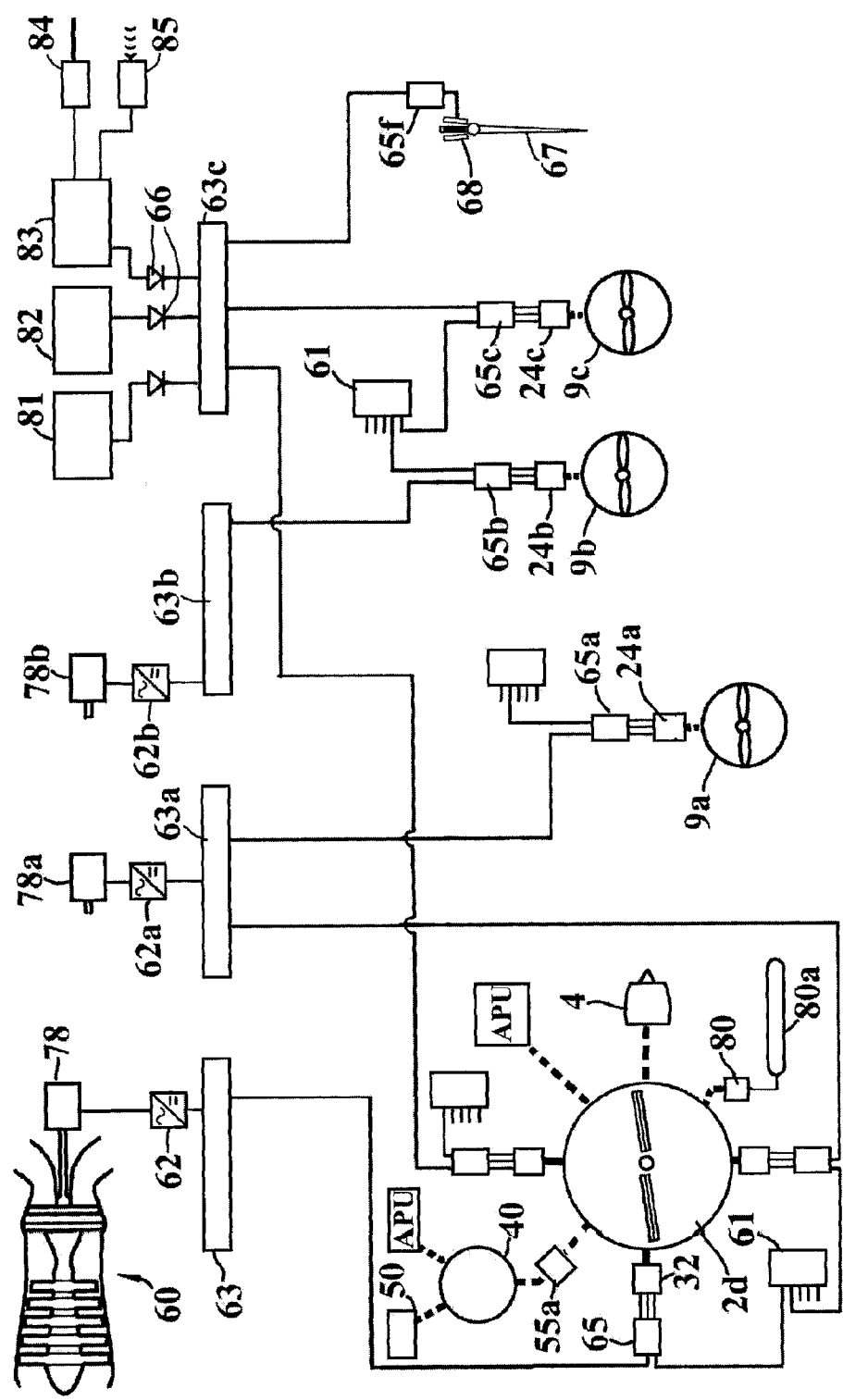
FIG. 44 shows a block diagram of an electrical power supply system of rotors motors and fans.

FIG. 44 shows the turbine or impeller or microturbine o turbo-shaft (60), which drives the generator (78) between approximately 10,000 to 200,000 RPM, the AC is sent to the rectifier (62) which applies the DC obtained to the bar (63), (60) also can represent a GPU or APU. The generators (78a and 78b) send the current to the rectifiers (62a and 62b) and once rectified to DC bars (63a and 63b). As an example are shown some fans whose bars (63, 63a, 63b, and 63c) feed the motor (32) of the rotary lenticular wing (2d) by the variable speed or frequency controllers (65), to the motors (24a, 24b and 24c) of the fairing fans (9a, 9b and 9c) and through the corresponding frequency or speed controllers (65a, 65b and 65c) and to the inverter (65f) which feeds the electromagnet (68) which drives the oscillating fin (67), controlled by the control signals or by stabilizing of the gyroscopes, accelerometers and/or GPS processed or controlled by the microprocessor or controller (61). The compressed air cylinder (80a) is also used to drive the turbine (80) and this the rotary wing. When several motors are used a system can use several gears which act on a common shaft or rotor to drive the fan. Can be used AC or DC motors. The battery (81), the fuel cell (82) and ultracapacitors or supercapacitors (83) feeds the bar (63c) through the semiconductor (66). Ultracapacitors additionally feed the laser gun (84) and the microwave gun (85). Each fan uses one engine and each engine can be fed from other speed or frequency controllers if mains power fails. The rotary wing (2d) is driven mechanically by the APU or by the gas turbine (4), mechanically or electrically with the flywheel (40) via the gear (55a) driven in turn by the GPU (50) and the APU. The rotary wing (2d) can be replaced by a blade rotor. The gas turbine can be replaced by a turbo-shaft engine, turboprop or motor with a large engine power/weight ratio.

Figure 45:
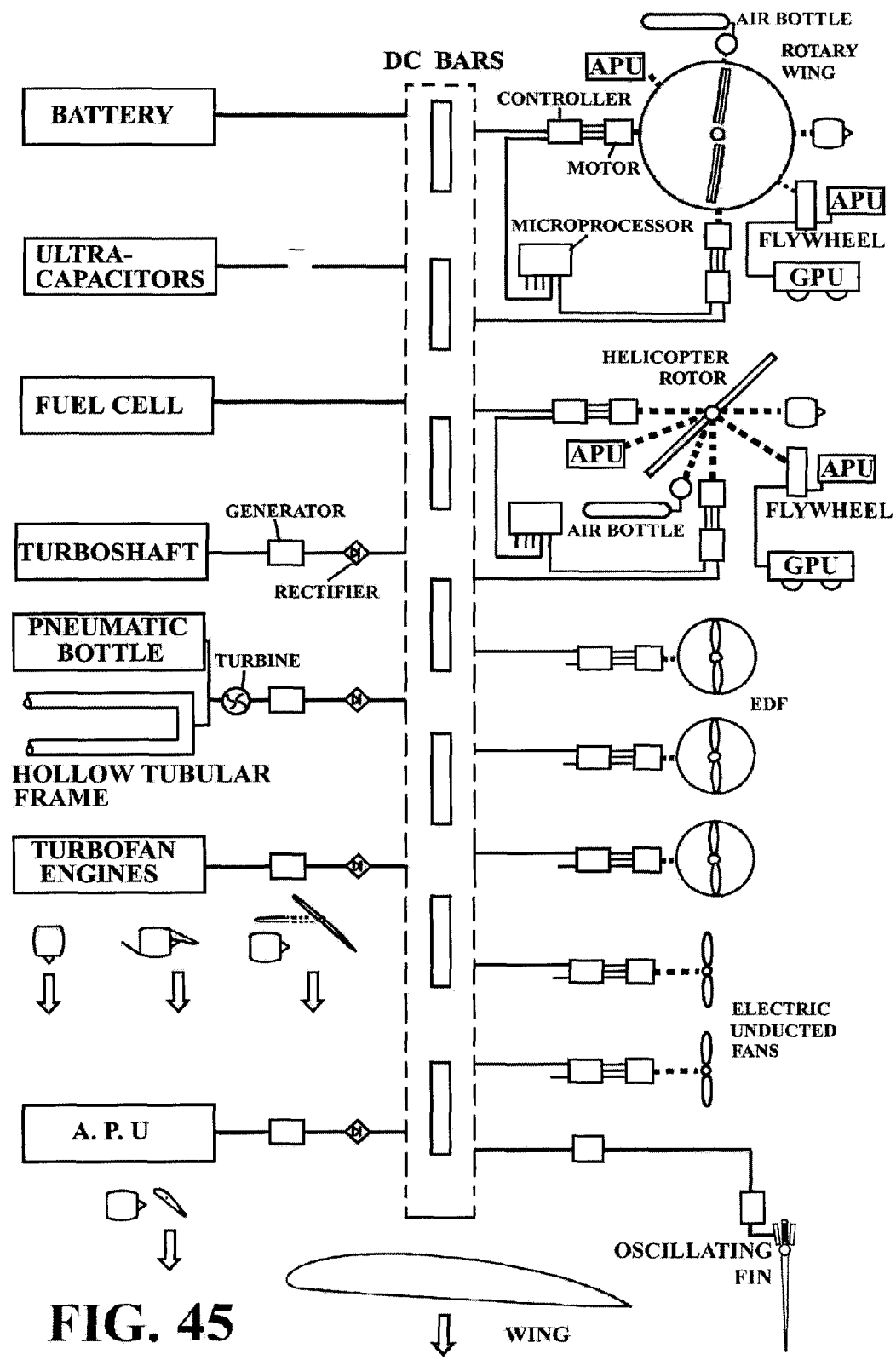
FIG. 45 shows a block diagram with different lift systems.

FIG. 45 shows a block diagram with different power supplies used in the lift and its use in rotary wings, rotors and fans. It is sown also the lift effected with the flow of the propulsion engines and APUs. One wing represents the aerodynamic lift during horizontal flight.

Figure 46:
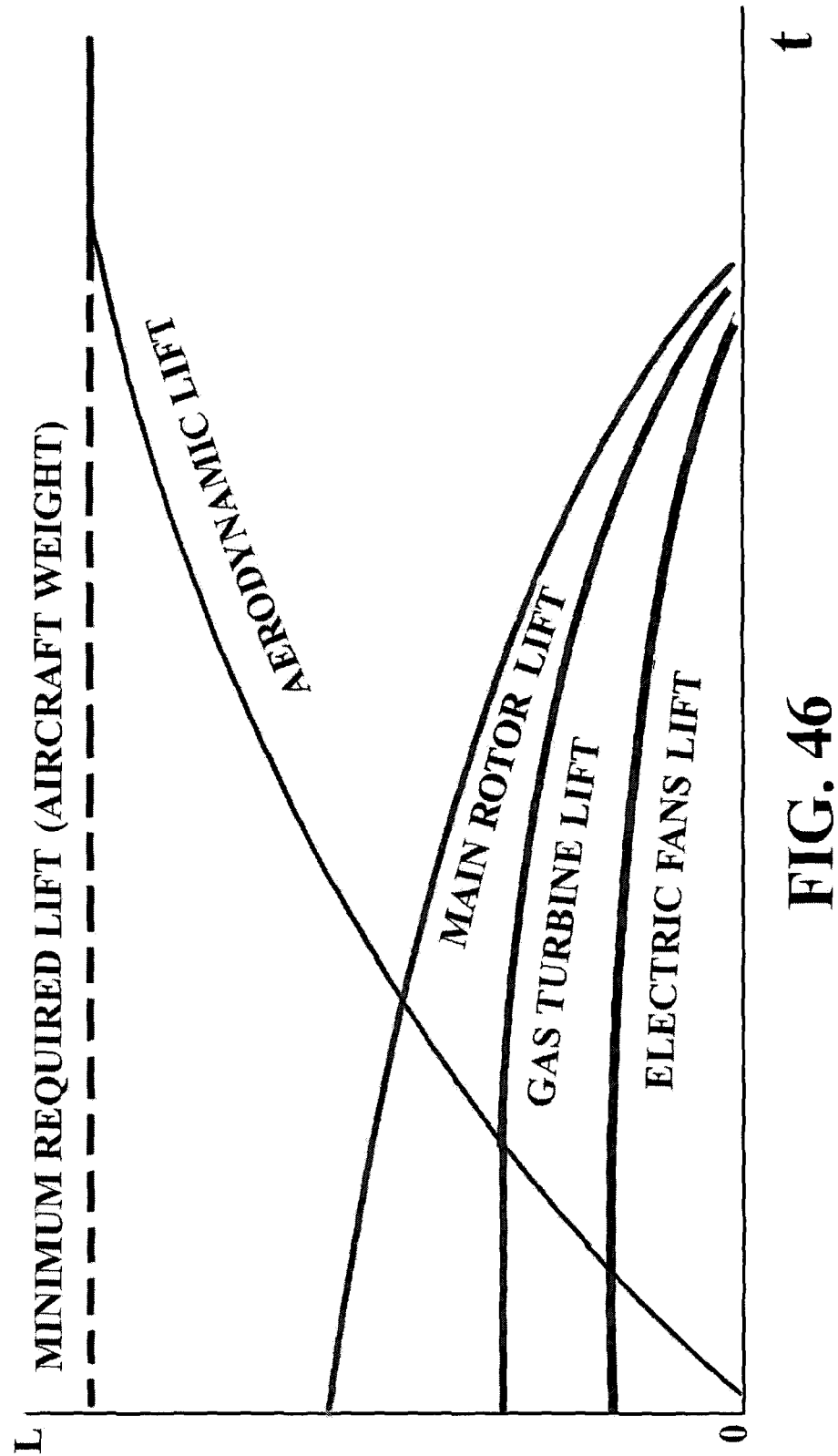
FIG. 46 shows the lift curves of various systems used in the system of the invention.

FIG. 46 shows the different curves of lift during takeoff and initial climb, when gas turbines involved, one or more rotors similar to the one used with helicopters, propellers or electrical fans with battery-powered motors, generators, ultracapacitors, fuel cells, etc. and the aerodynamic lift. All systems can operate simultaneously or only some of them. If the climb is vertical the aerodynamic lift is initiated later at the same time than the horizontal displacement. The lift diagram for the descend is similar to the previous, but with lower values. Aircraft carrying external rotors will used preferably narrow wings and fuselages and the flat bottom area to increase the lifting surface.

The invention claimed is:

1. A vertical takeoff and landing aircraft including a fuselage , said fuselage having a central axis, a lenticular wing , said lenticular wing rotatably affixed to a top of said fuselage at said central axis, said lenticular wing including protruding fins and grooves, said lenticular wing rotated by a shaft, said fuselage having a pair of canard fins horizontally attached to a front portion of said fuselage and a pair of stabilizer fins horizontally attached to a rear portion of said fuselage, each of said canard fins having at least one ducted fan passing through said each of said canard fins, each of said stabilizer fins having one or more ducted fans passing through said each of said stabilizer fins, a tail attached vertically to the rear of said fuselage, said tail having a ducted fan.

2. A vertical takeoff and landing aircraft as claimed in claim 1 wherein said shaft is rotated by a power plant selected from the group consisting of a mechanical power plant, a pneumatic power plant and an electrical power plant, said power plant deriving it's power from a power generator selected from the group consisting of flywheels, APU, propeller engines, and batteries.

3. A vertical takeoff and landing aircraft as claimed in claim 1 wherein said lenticular wing comprises a two-bladed rotor rotatably affixed to a top of said fuselage at said central axis.

4. A vertical takeoff and landing aircraft as claimed in claim 3 wherein said two bladed rotor is rigid.

5. A vertical takeoff and landing aircraft as claimed in claim 1 wherein said stabilizer ducted fans are rotatable and tiltable, whereby said stabilizer ducted fans aids in said vertical takeoff and landing aircraft in controlled vertical ascent and descent.

6. A vertical takeoff and landing aircraft as claimed in claim 5 wherein said canard ducted fans include shutters located both above and below said canard ducted fans, said shutters further comprise a plurality of tilting blades.

7. A vertical takeoff and landing aircraft as claimed in claim 6 wherein said stabilizer ducted fans include shutters located both above and below said stabilizer ducted fans, said shutters further comprise a plurality of tilting blades.

* * * * *